United States Patent [19]
Gerkens

[11] 3,753,735
[45] Aug. 21, 1973

[54] METHOD OF MAKING AN EXPANDED CRISP SNACK FOOD PRODUCT

[75] Inventor: Dirk R. D'Arnaud Gerkens, Breda, Netherlands

[73] Assignee: Nibb-It Products Association Ltd., Zurich, Switzerland

[22] Filed: Aug. 10, 1970

[21] Appl. No.: 62,645

[52] U.S. Cl............................... 99/100 P, 99/207
[51] Int. Cl............................................... A23l 1/12
[58] Field of Search.................... 99/100 P, 207, 83

[56] References Cited
UNITED STATES PATENTS

| | | | |
|---|---|---|---|
| 2,665,208 | 1/1954 | Spieser | 99/207 X |
| 3,027,258 | 3/1962 | Markakis et al. | 99/100 P |
| 3,259,503 | 7/1966 | Tan et al. | 99/83 |
| 3,297,450 | 1/1967 | Loska | 99/207 X |
| 2,863,770 | 12/1958 | Spieser | 99/1 |
| 3,076,711 | 2/1963 | Gerkens | 99/207 X |
| 3,131,063 | 4/1964 | Gerkens | 99/1 |
| 3,085,020 | 4/1963 | Backinger et al. | 99/207 |
| 3,451,822 | 6/1969 | Fast et al. | 99/100 P |
| 3,230,094 | 1/1966 | Hilton | 99/207 |
| 3,600,193 | 8/1971 | Glabe et al. | 99/83 |

Primary Examiner—S. Leon Bashore
Assistant Examiner—Frederick Frei
Attorney—Hammond and Littell

[57] ABSTRACT

Describes a method of making a snack food product from potato material having a reducing sugar content of above three percent on the dry basis, mixed with dried gelatinized starch to produce a reducing sugar content in said mixture of between one and two percent by weight, which mixture is seasoned with salt and other flavoring materials, and made into an extrudable mass by the addition of water, the mass extruded, the extruded material is dried and fried into a crispy expanded snack product.

3 Claims, No Drawings

METHOD OF MAKING AN EXPANDED CRISP SNACK FOOD PRODUCT

This application relates to an improved method of producing crispy fried expanded foodstuff of the snack food type, such as described in U. S. Pat. No. 2,863,770. The extruded dried piecelets referred to in said patent are known in the trade and referred to herein as "half product" or "fry ready" material and are fried in hot fat to produce a crispy expanded snack food with weight to volume ratio of 0.16 to 0.22. Other patents relating to the production of said snack food products are U.S. Pat. Nos. 3,076,711 and 3,131,063. The extruded and dried product or "half product" is produced in a central factory and sold to potato chippers for frying into the final crispy expanded snack food.

In producing the product according to the method described in said U.S. Pat. No. 2,863,770, it is necessary to use potatoes which are not too high in reducing sugar content to get the right color and crispness in the final product. If the final fried product is too low in reducing sugar content and too light in color, it will have no appeal to the consumer and if it is too dark, it, likewise, will not be purchased on account of its unpleasant color and the bitter taste which goes with too high reducing sugar content. I have found that a reducing sugar content between one and two percent in the dried, extruded half product which is to be subsequently fried into this crispy expanded snack food produces, on frying, the best color, crispness and other properties in the final product.

However, potatoes with this low reducing sugar content are also in demand for producing french fried potatoes, potato chips and other potato products and, hence, command a premium price which increases the cost of the crispy expanded foodstuff produced by the process of said patent.

In water-blanching raw potatoes, about one-third of the reducing sugar content is lost or destroyed, so that, for example, raw potatoes with a reducing sugar content of 1.5 to 4.5 percent, when blanched, will produce a potato flour containing only about two-thirds the reducing sugar content of the original potatoes, calculated on the dry basis.

The producers of potato snack foods, potato chips, french fried potatoes and mashed potato products, therefore, all prefer to buy potatoes which, when blanched and dried, will have a reducing sugar content of about one to two percent which makes the cost of such premium potatoes high with reference to other potatoes having a higher reducing sugar content. Freshly harvested potatoes containing reducing sugar content of one to two percent on the dry basis are the preferred raw material for making a large variety of processed potato products and, hence, always command premium prices over potatoes having higher reducing sugar content.

Potatoes which have been stored often have a reducing sugar content of 4.5 percent or more before water-blanching and drying and three percent or more on the dry basis after processing and hence, cannot normally be used for the production of potato products such as listed above.

The blanching of the cut potatoes performs a dual function; namely, inactivation of enzymes to prevent undesired chemical reactions and gelatinization of the potato starch. The better the gelatinization, as long as retrogradation of the starch is not effected, the higher is the water binding ability of the flour. The blanching purposes are best achieved by using as small potato pieces as possible, high blanching temperatures and long blanching times but solids content losses in the processed potatoes is increased by degradation by overcooking and by leaching out. Therefore, the blanching process has to balance the two factors and, in practice, water blanching is effected at about 99° C for 7 to 9 minutes but solids content loss here is still about five percent by weight.

Care also has to be taken in the air drying step since the water binding properties of the potato flour decrease if the drying temperature is too high and/or if the drying time is prolonged. Preferably, the drying is effected at about 70° C for approximately four hours to obtain a final moisture content of about nine percent.

The potato powder, which generally has a moisture content of about nine percent on wet basis, is mixed with an amount of water such that the water content of the dough is between 28 and 35 percent on a wet basis. In the water, sufficient salt is dissolved that between three and six percent, preferably between four and five percent of salt is present calculated on weight of the original potato powder. Other seasoning materials and colors may be added.

The dough is extruded in a press through small orifices for which a pressure of 50 to 100 atmospheres is required. The friction of extrusion causes so much heat, that at least the head of the press must be cooled with running water and some further cooking occurs. The rubber-like bands of dough which are extruded may be cut to desired lengths and are then air-dried at a moderate temperature so that the moisture content of the intermediate product is between six and ten percent, preferably between eight and nine percent.

This dried, extruded, intermediate material has a hard, horny outer surface and is called the half-material. This half-material may be stored and shipped as desired, provided the moisture content is kept within the specified limits or is restored to the specified limits prior to frying. It is used to produce the final edible product hereinafter described.

For producing the edible product, the half-material is fried in an edible oil for 8 to 20 seconds, the oil being kept at 365° to 400°F. It swells or puffs very appreciably, giving a fried material of weight to volume ratio of 0.22 to 0.12, preferably near 0.18, and fat content of between 15 and 25 percent.

The two most critical properties of the final potato flour mixture for a satisfactory expanded foodstuff are the water binding property and the reducing sugar content of the flour. Too low water binding property gives an insufficient expansion during frying and a cookie-like bit to the expanded foodstuff and too high a water binding property makes the dried piecelets and the expanded fried product too hygroscopic and the expanded food product is expanded too much and is too brittle. If the reducing sugar content of the potato flour is too high the expanded formed foodstuff has a brown color and a bitter taste while a reducing sugar content which is too low gives a pale-colored expanded foodstuff. The reducing sugar content is preferably between 0.8 and 2.5 percent, and in particular between one to two percent by weight of the potato flour on a dry basis and this has previously required the use of special grades of potatoes.

I have found, however, that if potato flour or other potato sources having a high reducing sugar content (above three percent on the dry basis before water-blanching) are mixed with potato starch or starch from other sources, in the proper proportions, and extruded and dried as described in said U.S. Pat. No. 2,863,770, a half product may be produced which contains reducing sugar in the right amount, which will produce, upon frying in hot fat, a crispy, expanded product which will have the desired color, taste and bite characteristics and that the raw materials used are much cheaper than when premium grade potatoes are used.

OBJECTS OF THE INVENTION

One of the objects of this invention is, therefore, to produce a desirable crispy fried food product from cheaper raw materials than could heretofore be used.

Another object of my invention is to produce an extruded half product, which when fried will produce a crispy expanded snack food, from a mixture of potatoes with a high reducing sugar content, and dried gelatinized starch.

Another object of my invention is to produce a crispy expanded snack food which will have the desired taste and color from a mixture of potato flour with a high reducing sugar content and dried gelatinized starch, in which the two ingredients of the mixture provide, in the half product, a reducing sugar content which will cause the half product to fry to a desired color, between a brownish yellow and full light brown product as described in Table II below.

Various other objects and advantages of the invention will appear as this description proceeds.

DESCRIPTION OF THE INVENTION

Dried gelatinized starch is produced in large quantities and can readily be purchased on the open market and when mixed in the approximate weight ratio of 20 to 50 percent starch to 80 to 50 percent potato powder having a high reducing sugar content (above two percent on the dry basis) produces an extruded dried "half" or "fry ready" material which when fried has the desired color, taste and crunchiness.

The dried gelatinized starch has no reducing sugar content and has no potato taste and having no cell walls gives an almost resistless bite when processed and in fact "melts" or dissolves in the mouth and, therefore, cannot be used alone to produce the snack food product, but when mixed in the ratio of about 20 to 50 parts, preferably 30 to 50 parts by weight to 80 to 50 parts, preferably 70 to 50 parts by weight of potato flour having a reducing sugar content above two percent on the dry basis and extruded and dried as described in U.S. Pat. No. 2,863,770, it produces a half product which, when fried, has the desired potato taste, the desired puffiness and the desired color, as described below.

In addition the dried gelatinized starch has a high swelling power and when mixed with the potato flour having a reducing sugar content above two percent on the dry basis, it influences the swelling power of the mixture in a favorable manner. This enables the use of poor grade potato flour having a low swelling power or, more advantageous, the replacement of some of the potato flour having a reducing sugar content above two percent and a good swelling power by low grade potato powder.

The low grade potato flour used to dilute the water-binding or swelling power during frying and to a lesser degree also the reducing sugar content is well known. This low grade potato flour would have a swelling power as measured by the modified rehydration factor of less than 7 although flours with higher swelling power can be utilized. Examples of suitable low grade potato flour are instant potato products, potato flakes and potato flour which are off grade and do not come up to the standards required for making an expanded potato product. Instant potato products and potato flakes of good quality always have a low modified rehydration factor, since starch not enclosed in the cell walls makes the product sticky. These products can be used as an admixture in our process, even if the amount of free starch is too high to make them acceptable as an instant potato product. Also, dried potatoes which have been stored for a long time and which have relatively high degree of retrograded starch and a low modified rehydration factor may be processed to potato flour and utilized in the practice of the invention.

An accurate measure of the suitability of the dried potato powder mixture with respect to its water-binding property for producing the desired puffed end product can be obtained by determining the rehydration factor of the dried powder mixture. This is the quantity of water, which a certain quantity of dried powder can bind, divided by the weight of the powder used in the test.

Good potato powder mixtures for producing puffed products can have a rehydration factor of 12 to 15 but the ideal rehydration factor for producing the best puffed product is 8 to 11. Therefore, it is possible to mix various potato powders in the desired proportions to produce a mixture having a rehydration factor of 6 to 17, preferably 8.5 to 11 and to extrude dry and fry to produce the best type of puffed end product.

I have found that the swelling power of the half material in the hot oil can be accurately measured beforehand by measuring the rehydration factor of the ground potato powder mixtures. The measurement of the rehydration factor of dried starch materials, i.e., their ability to readsorb water is described in "Food Dehydration," Wallace Van Arsdel and Michael Copley, the Avi Publishing Co., Inc., 1963, pp. 81 to 82. The rehydration factor, as there described, is for dried vegetables, meat and potatoes in the form of pieces. For a ground potato, rice, tapioca and corn flour, a modification of this method, developed by me must be used. The method of measurement is as follows.

MODIFIED REHYDRATION FACTOR TEST

From the dried potato or other powder to be investigated, a portion is sieved and the portion which passes through a sieve 70 mesh and is retained on a sieve 100 mesh is used.

2 grams of this sieved powder are put into a calibrated measuring cylinder with an inner diameter of 1 inch. 40 ml of tap water of room temperature (20–25° C) are added, and the mass is stirred with a glass rod, care being taken that no lumps remain. The cylinder is now left quiet for two hours and the swollen potato meniscus is read. This reading, divided by two, is the modified rehydration factor (mrf).

From the "Bintje" variety of Dutch potato, (a yellow fleshed potato), several batches of the puffed end product were made by the prior art process, varying only the cut, the blanching-time and temperature and the drying conditions in order to vary the modified rehydration factor of the potato flour; all other conditions were kept constant, (e.g., salt content 4.5 percent on half material with 9 percent moisture). The results are shown in Table I.

TABLE I

| Batch | m.r.f | Weight to Volume Ratio: of Puffed Final Product |
|---|---|---|
| 1 | 2 | about 1 |
| 2 | 6 | 0.31 |
| 3 | 9 | 0.18 |
| 4 | 12 | 0.16 |
| 5 | 13 | 0.14 |
| 6 | 17 | 0.12 |
| 7 | 20 | 0.10 |

Although it may seem advantageous to make a product with very low weight to volume ratio which means a highly puffed product, the practical limitation is that the more the product is puffed, the thinner and thus the more brittle are the material walls. In handling, there is too much breakage and pulverization so that a balance between puffiness and breakability must be maintained.

In marketing, the puffed product is packed in bags by weight. The weight of the contents of a bag is indicated on the bag. Variations in the weight to volume ratio of the product will result in half filled bags up to overfilled bags with broken contents, and a highly puffed, weak product will result in breakage in the bags producing fine crumbled pieces which the customer will reject.

For these reasons, a weight-to-volume ratio of between 0.20 and 0.12 (preferably near 0.18) is preferred. This means that potato powder mixes having an m.r.f. of between 8.5 and 17, preferably near 9.5 should be used as the starting material.

The process of the present invention readily enables the adjustment of the potato powder mixtures to within the desired reducing sugars content of from one to two percent, based on the dry weight of the powder, and a swelling power as determined by the modified rehydration factor of between 8.5 and 17.

The potato flour used as one ingredient of the potato powder mixture may be produced from full raw potatoes which may be ground into a slurry and dried to a powder on a drum dryer or other scraped heated surface, or from cut, blanched and dried potatoes or may be low grade mashed potato powder, granules or flakes having a high reducing sugar content (above two percent on the dry basis).

When this potato flour is mixed with dried, gelatinized (tasteless) starch of commerce, in the right proportions and extruded into piecelets and dried, the half product has the desired potato taste, the starch imparts additional puffiness to the fried product and the reducing sugar content of the dried half product can be adjusted to give the desired color to the fried product.

The weight ratio of dried, gelatinized starch to dried potato product or flour can vary from 20 to 50 percent starch to 80 to 50 percent potato product, depending upon the color, puffiness, bite characteristics and weight to volume ratio desired in the final fried product, and the process of this invention can, therefore, be used with a wide variety of potato products having a reducing sugar content above two percent on the dry basis and still be adjusted by means of the starch: potato ratio to give a half material having a reducing sugar content between one to two percent, which on frying will produce a fried, puffed, crispy product of substantially uniform characteristics regardless of variations in the potato raw materials available for use in the process.

I have found that frying a half material with no reducing sugar content produces a substantially white (undesirable) end product and that as the reducing sugar content of the half or dried, extruded material goes up, the color of the fried product changes as follows:

TABLE II

| Reducing Sugar Content Dry Basis | Color of End Product |
|---|---|
| About 0.5% | Almost White |
| About 0.7% | Lightly Yellow |
| About 1.0% | Brownish Yellow |
| About 1.5% | Full Light Brown |
| About 2.0% | Fuller Brown |
| About 2.5% | Quite Brown |
| Over 2.5% | Too Dark Brown |

Parallel with the brown color, produced when there is more than two percent of reducing sugar in the dried half product, a bitter taste is produced. The colors and tastes the public prefers correspond to a reducing sugar content between about 1.0 and 2 percent in the extruded and dried "half product" or "fry ready" product.

Translated into the raw potato (when no addition is made of starch products which are free of reducing sugars) and taking into account the loss of about one-third of the reducing sugar during water-blanching, drying and other processing of the raw potatoes, this means that potatoes with below 1.5 percent reducing sugar content (which are seldom available), give light colored end products which are not much desired by the public; That potatoes with between 1.5 and 3.0 percent will give the products the public prefers; and with potatoes having over three percent reducing sugars, good products cannot be obtained. However, by the use of this invention, potatoes with up to six percent reducing sugars can be used because they yield a dry product after blanching with about four percent reducing sugar and with the admixture of 50 percent of starch to 50 percent of potato product, a reducing sugar of about two percent in the dried half product can still be achieved.

From this it is clear that the producers of potato snack products, chips and french fries, and to some extent also the mashed potato factories, prefer to buy potatoes which have about two percent or less of reducing sugar content on the dry basis.

As in stored potatoes, contents of three percent and more reducing sugar, on the dry basis, are more often the rule than exception, there is a high demand for the raw potato material having the desired reducing sugar content, which reflects itself in an extra price and a large amount of laboratory control work. Even with potatoes having below two percent reducing sugar content on the dry basis, there are color fluctuations which are difficult to control.

However, by mixing colorless and tasteless dried gelatinized starch with potato products having a high reducing sugar content (about three percent on the dry basis), the end product of my process can be controlled within wide limits while still using relatively low cost starch and low cost potato raw materials.

The addition of dried gelatinized starch lowers the potato taste (after frying) in direct relation to the amount added, and by not water-blanching the potatoes, but drying the full ground potato slurry there is about one and a half times as much potato taste which permits the addition of tastelss starch and still leaves enough potato taste after frying.

Another advantage of the method of this invention is that the starch, free from cell walls, after gelatinization and drying, has a tremendous swelling power on frying. This swelling power as measured by the modified rehydration factor is usually above 17.

Thus, by controlling the reducing sugar content by the addition of starch, at the same time the swelling power is appreciably increased, making it possible to buy second quality potatoes of high solids content and high yield which when processed, give a potato flour with a swelling power of 7 to 8 as measured by the modified rehydration factor and still have the desired characteristics in the fried snack products.

If dried mashed potato powder is used as the partial potato source for this invention, the higher the blue value index the better for my process. Such a mashed potato powder has a swelling power of 4 or less as measured by the modified rehydration factor.

In the practice of the process of this invention, the gelatinized starch in dry form is mixed with potato flour of the right chaaracteristics, in such proportions that the desired reducing sugar content, potato taste and swelling power is reached after mixing the starch and potato flour. Water, salt and flavoring ingredients are then added to this mixture and the product extruded and dried or otherwise formed into piecelets and dried, and the dried piecelets fried as described in said prior patents. A superior end product is thereby produced. The process is easier to control and the raw material costs are lower.

Gelatinized starch from either potato, corn or tapioca sources can be used and the potato flour may be produced from low grade potatoes having a high reducing sugar content (above three percent on the dry basis before water-blanching), from mashed potato powders or any other potato source. All percentages given are by weight and not by volume.

The following examples of the process are given by way of illustration, but the process is not limited to these specific examples.

EXAMPLE I

Second quality field crop potatoes of the Bintje variety containing 22 percent solids content and 3.2 percent reducing sugar based on the solids content were washed and lye peeled. The peeled potatoes were then ground in a hammer mill to obtain a thin slurry of finely divided potatoes and sufficient sodium bisulfite was added thereto to obtain an $SO_2$ content of about 50 ppm. The slurry was dried on a drum dryer (or scraped surface heat exchanger), then ground to a size whereby 100 percent was −40 mesh, at least 70 percent was −50 mesh and at least 50 percent was −70 mesh. The powdered flour had a reducing sugar content of 2.9 percent, a modified rehydration factor of 8 and a moisture content of about eight percent. 300 kilos of said potato flour were admixed with 300 kilos of gelatinized raw potato starch having a modified rehydration factor of 17 to provide a reducing sugar content of between one and two percent and a modified rehydration factor of 12.5 in the mixture.

100 kilos of the said mixture was then made into a dough by the addition of 5 kilos of salt and 35 kilos of water, to produce an extrudable mass having a moisture content of 28 to 35 percent. Other flavoring materials may be added to the extrudable mass. This mass was extruded under pressure into coherent bands and the bands were cut into piecelets of about 30 mm and dried to a moisture content of eight percent. This intermediate product or "half product" may be fried immediately or shipped to a frying point and then fried into the final crispy expanded food product. When the piecelets are fried for about 15 seconds in fat at 180° C, a crispy expanded food product having a pleasing light brown color, a weight-to-volume ratio of 0.15, and an agreeable taste and bite is produced.

EXAMPLE II

A mixture of low grade potatoes (culls) of several varieties having a solids content of 23 percent and a reducing sugar content of 5.0 percent, based on the solids content, were washed, steam peeled, cut to pieces of 10 × 10 × 3 mm., water-blanched and dried with warm air to a moisture content of 10 percent. The pieces were ground to a size whereby 100 percent was −40 mesh, at least 70 percent was −50 mesh and at least 50 percent was −70 mesh. The powdered flour had a reducing sugar content of 3.0 percent, a modified rehydration factor of 7, and a moisture content of about eight percent. 300 kilos of this potato flour were mixed with 200 kilos of gelatinized corn starch having a modified rehydration factor of 18 to provide a reducing sugar content of between one and two percent and a modified rehydration factor of 11 in the mixture.

100 kilos of the said mixture was then made into a dough by the addition of 5 kilos of salt and 35 kilos of water to provide an extrudable mass having a moisture content of 28 to 35 percent. This mass was extruded under pressure into coherent bands and the bands were cut into piecelets of about 30 mm and dried to a moisture content of eight percent. This intermediate product or "half material" may be fried immediately or shipped to a frying point and then fried into the final crispy expanded food product. When the piecelets are fried for about 15 seconds in fat at 180° C, a crispy expanded food product having a nice light brown color and a weight-to-volume ratio of 0.17 and an agreeable taste and bite is produced.

EXAMPLE III

Potatoes of the Maritta variety having a reducing sugar content of 3.3 percent were lye peeled, cut to cubes of 10 × 10 × 10 mm, blanched in a water blancher and dried to a moisture content of nine percent. The cubes were ground to a size, whereby 100 percent was −50 mesh, at least 70 percent was −70 mesh and at least 50 percent was −100 mesh. The reducing sugar content of the potato flour was 2.3 percent on the dry basis and the modified rehydration factor was 12. A mixture was made of 100 kilos of the abovementioned potato flour, 200 kilos of mashed potato flakes having a modified rehydration factor of 4 (which were rejected because the reducing sugar content was two percent and the blue value index was 100), and 150 kilos of dried gelatinized tapioca starch having a modified rehydration factor of 18.

100 kilos of this mixture, having a reducing sugar content of 1.4 percent and a modified rehydration factor of 10 were made into a dough by the addition of 4.5 kilos of salt and 43 kilos of water to form an extrudable mass having a moisture content of 35 percent. This mass was extruded under pressure into coherent bands and the bands were cut to piecelets of about 12 mm length and dried to a moisture content of nine percent. This intermediate product or "half product" may be fried immediately or shipped to a frying point and then fried into the final crispy expanded food product. When the piecelets are fried for about 12 seconds in fat at 185° C, a crispy expanded food product having a nice brownish-yellow color and a weight-to-volume ratio of 0.18 and an agreeable taste and bite is produced.

EXAMPLE IV 150 kilos of Maritta potato flour of Example III were mixed with 100 kilos of mashed potato granules having a modified rehydration factor of 4 (which were rejected for commercial sale because the reducing sugar content was 2.5 percent and the blue value index was over 100) and 150 kilos of pre-gelatinized dry potato starch having a modified rehydration factor of 18. The reducing sugar content of this mixture was 1.5 percent and the modified rehydration factor was 12.

100 kilos of this mixture was made into a dough by the addition of 4.5 kilos of salt and 43 kilos of water, to form an extrudable mass having a moisture content of 35 percent. This mass was extruded under pressure into coherent bands the bands were cut into piecelets of about 12 mm length and dried to a moisture content of nine percent.

This intermediate product or "half product" may be fried immediately or shipped to a frying point and then fried into the final crispy, expanded food product. When the piecelets are fried for about 12 seconds in fat at 185° C, a crispy, expanded food product having a nice brownish yellow color and a weight-to volume ratio of 0.16 having an agreeable taste and bite is produced.

The preceeding specific embodiments are illustrative of the practice of the invention. It is to be understood, however, that other expedients known to those skilled in the art may be employed without departing from the spirit of the invention or the scope of the appended claims.

I claim:
1. A process for producing an improved crispy expanded foodstuff which comprises admixing from 70 to 50 parts by weight of a potato material consisting of 50 to 100% of blanched, ground dried potatoes in the form of potato flour, having a reducing sugar content of about 2 to 4% on a dry basis and 0 to 50% of a low grade dried potato material having a modified rehydration factor of less than 7, with from 30 to 50 parts by weight of a dried, pregelatinized starch in such amounts as to obtain a potato flour mixture having a reducing sugar content of between 1 and 2% on the dry basis and a modified rehydration factor of between 8.5 and 15, mixing said potato flour mixture with water and salt to product an extrudable mass having a moisture content of 28 to 35%, extruding said mass under pressure to form coherent bands, cutting the bands into piecelets, drying the piecelets to a moisture content between 6 and 10% and frying the dried piecelets in deep fat to produce a crispy expanded foodstuff.

2. The process of claim 1, in which the potato material is from the group consisting of dried potato flour, drum blanched and dried potatoes, mashed potato powder, potato granules and potato flakes having a reducing sugar content above three percent on the dry basis and the dried gelatinized starch is from the group consisting of potato, corn and tapioca starch.

3. A process for producing an extrudable mixture of potato flour mixture and water utilizable in the production of a crispy expanded fried foodstuff which consists essentially of admixing from 70 to 50 parts by weight of a potato material consisting of 50 to 100% of blanched, ground, dried potatoes in the form of potato flour, having a reducing sugar content of about 2 to 4% on a dry basis and 0 to 50% of a low grade dried potato material having a modified rehydration factor of less than 7, with from 30 to 50 parts by weight of a dried pregelatinized starch in such amounts as to obtain a potato flour mixture having a reducing sugar content of between 1 and 2% on the dry basis and a modified rehydration factor of between 8.5 and 15, mixing said potato flour mixture with water and salt to produce an extrudable mass having a moisture content of 28 to 35%.

* * * * *